US008112890B2

(12) United States Patent
Collison

(10) Patent No.: US 8,112,890 B2
(45) Date of Patent: Feb. 14, 2012

(54) DECORATIVE BEAD AND OTHER ORNAMENTAL OBJECTS AND THEIR METHOD AND TOOLS OF MANUFACTURE

(76) Inventor: Catherine A. Collison, Northfield, MN (US)

( * ) Notice: Subject to any disclaimer, the term of this patent is extended or adjusted under 35 U.S.C. 154(b) by 940 days.

(21) Appl. No.: 12/152,982

(22) Filed: May 19, 2008

(65) Prior Publication Data

US 2009/0282684 A1 Nov. 19, 2009

(51) Int. Cl.

| | |
|---|---|
| ***B21D 28/00*** | (2006.01) |
| ***B23P 13/04*** | (2006.01) |
| ***A44C 25/00*** | (2006.01) |
| ***A44C 27/00*** | (2006.01) |

(52) U.S. Cl. .................... 29/896.41; 29/896.43; 29/557; 63/33; 72/338

(58) Field of Classification Search ................. 29/896.4, 29/896.41, 896.43, 557, 463; 24/1; 63/33, 63/38, 39; 72/311, 333, 338

See application file for complete search history.

(56) References Cited

U.S. PATENT DOCUMENTS

| | | | | |
|---|---|---|---|---|
| 2,177,928 | A * | 10/1939 | Knudsen | 137/433 |
| 2,366,775 | A * | 1/1945 | Essex | 72/353.2 |
| 3,514,839 | A * | 6/1970 | Rodrigues | 29/463 |
| 7,856,860 | B1 * | 12/2010 | Collison | 72/80 |

* cited by examiner

*Primary Examiner* — Alexander P Taousakis

(74) *Attorney, Agent, or Firm* — Antonio Papageorgiou; Ostrow Kaufman LLP

(57) ABSTRACT

The present invention in one embodiment is a bead formed from bottle caps of a beverage container. In another embodiment of the invention, pieces of jewelry or other ornamental objects are formed from bottle caps of beverage containers. In yet another embodiment of the invention, pieces of jewelry or other ornamental objects are formed from the metal of cookie tins, candy tins, mint tins or similar metal containers. After appropriate preparation, a bottle cap or piece of metal from a tin is placed in a press tool having a punch member forming tool and cutting die that cooperatively interact to reform the bottle cap or metal from a tin, and in some cases punch out a piece of the bottle cap or metal from a tin. This produces, in several embodiments, a component that will be joined with one or more other similar components to form the bead or ornamental object of desire. In other embodiments, the reformed bottle cap or piece punched out of the bottle cap or tin is the desired ornamental object itself.

10 Claims, 11 Drawing Sheets

DECORATIVE BEAD AND OTHER ORNAMENTAL OBJECTS AND THEIR METHOD AND TOOLS OF MANUFACTURE

BACKGROUND OF THE INVENTION

1. Field of the Invention

The present invention is directed to ornamental objects and methods for making such ornamental objects.

2. Description of Related Art

Many people enjoy displaying new and interesting ornaments such as beads, especially when such beads are joined together into a necklace or other form of jewelry. Also, many people enjoy displaying colorful, novel, lively or unique articles of jewelry.

In addition, many beverages come in bottles with bottle caps. Often, these bottle caps are very decorative and display interesting logos, colors, patterns or trademarks. Typically, once a bottle cap is removed from a bottle, the bottle cap is simply discarded which then becomes waste that is ultimately disposed of. Consequently, it is highly desirable to provide an interesting and visually attractive ornamental object or piece of jewelry that is made from a bottle cap.

THE SUMMARY OF THE INVENTION

The present invention in one embodiment is a bead formed from bottle caps of a beverage container. In another embodiment of the invention, pieces of jewelry or other ornamental objects are formed from bottle caps of beverage containers. In yet another embodiment of the invention, pieces of jewelry or other ornamental objects are formed from the metal of cookie tins, candy tins, mint tins or similar metal containers. After appropriate preparation, a bottle cap or piece of metal from a tin is placed in a press tool having a punch member forming tool and cutting die that cooperatively interact to reform the bottle cap or metal from a tin, and in some cases punch out a piece of the bottle cap or metal from a tin. This produces, in several embodiments, a component that will be joined with one or more other similar components to form the bead or ornamental object of desire. In other embodiments, the reformed bottle cap or piece punched out of the bottle cap or tin is the desired ornamental object itself There are many objects of the present invention in its various embodiments that may be addressed individually or in combinations and permutations. Each embodiment may address one or several of the following objectives.

An object of this invention in one embodiment or variant of the invention is to produce an attractive ornamental object made from a single bottle cap.

Another object of this invention in one embodiment or variant of the invention is to produce an attractive ornamental object made from more than one bottle cap.

Another object of this invention in one embodiment or variant of the invention is to produce an attractive ornamental object made from one or more than one bottle caps that is displayed by itself.

Another object of this invention in one embodiment or variant of the invention is to produce an attractive ornamental object made from one or more than one bottle caps that is displayed in combination with other similar ornamental objects.

Another object of this invention in one embodiment or variant of the invention is to reduce the amount of waste produced by throwing away bottle caps.

An object of this invention in one embodiment or variant of the invention is to produce a method for producing an attractive ornamental object made from a bottle cap.

Another object of the present invention in one embodiment or variant of the invention is to provide tools to produce an attractive ornamental object made from a bottle cap.

These and other objects and advantages of the invention will be clear in view of the following description to the invention including the associated drawings.

BRIEF DESCRIPTION OF THE DRAWINGS

The invention will be described hereafter in detail with particular reference to the drawings. Throughout this description, like elements, in whatever embodiment described, refer to common elements wherever referred to and referenced by the same reference number. The characteristics, attributes, functions, interrelations ascribed to a particular element in one location apply to that element when referred to by the same reference number in another location unless specifically stated otherwise. All Figures are drawn for ease of explanation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength and similar requirements will likewise be within the skill of the art after the following description has been read and understood.

DETAILED DESCRIPTION OF THE INVENTION

Figure 1:
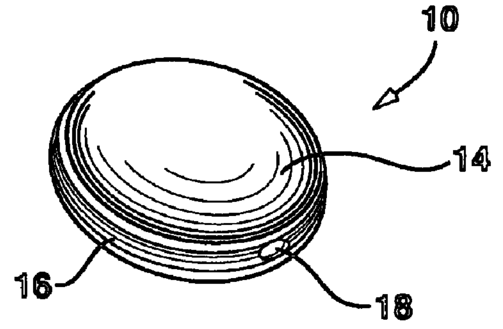
FIG. 1 is a perspective view of a bead of one embodiment of the invention.
Figure 2:
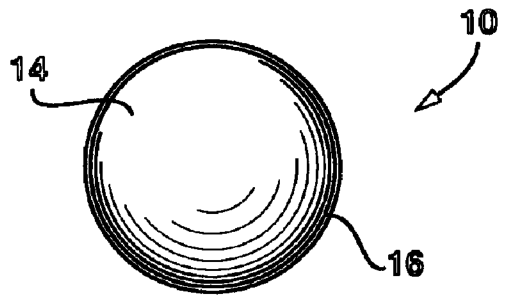
FIG. 2 is a front view of the bead of FIG. 1.
Figure 3:
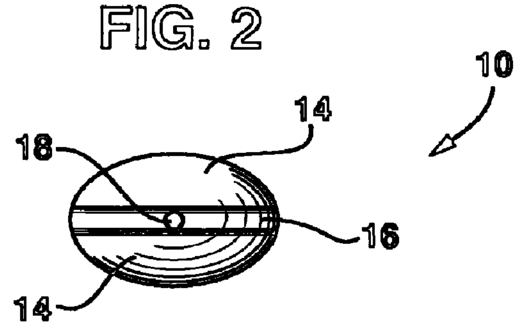
FIG. 3 is a top view of the bead of FIG. 1.
Figure 4:
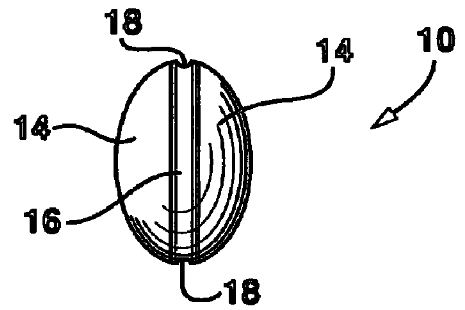
FIG. 4 is a side view of the bead of FIG. 1.

A bead of the present invention in one embodiment is shown in FIGS. 1-4 generally labeled 10. The bead 10 is made, as will be described hereafter, from two bottle caps 12. As can be seen, the bead 10 has two punch members 14 that are joined along a common connection area 16 that extends entirely around each punch member 14. Throughout this description, the term "punch member 14" is used to describe a piece formed from the center portion of a bottle cap 12. But, as will be seen, any particular punch member 14 may have any 2-dimensional shape as will be described hereafter or any 3-dimensional shape including, but not limited to, convex or flat as will also be described in detail hereafter.

At least one hole 18 (FIG. 3) is drilled through the connection area 16 to allow the bead 10 to be used or displayed in an ornamental way such as via a necklace, brooch, earring or pennant. In a preferred embodiment of the bead 10 shown in FIG. 4, there are two holes 18 located on opposite ends of the bead 10 that allow the bead 10 to be formed in a string of beads such as would occur on a necklace.

As mentioned above, each bead 10 in the preferred embodiment is made from two bottle caps 12. The most common source of such bottle caps 12 is recovery of the bottle cap from beverage containers after the beverage containers have been opened. As a result, these bottle caps 12 must be prepared to be turned into the beads 10 of the present invention. Each bottle cap 12 has a central portion 20, a peripheral edge 22, an inner surface 24 and a seal 26 located on the inner surface 24 that forms an airtight seal with the top of the beverage container when the bottle cap 12 is in place on the beverage container. The seal 26 may take the form of natural cork, artificial cork or plastic and may be in the form of a disk or an annular washer.

The central portion 20 is the flat portion of the bottle cap 12 that often contains a trademark or other written or printed indicia on its outer surface. The portion of the bottle cap 12 moving inward from the peripheral edge 22 to the central portion 20 is crenellated, that is, formed in a repeating series of undulations, which crenellations were formed as part of the process of sealing the bottle cap 12 on the beverage container. There is a shoulder connecting the central portion 20 to the crenellated portion that extends to the peripheral edge 22 of the bottle cap 12.

Figure 5:
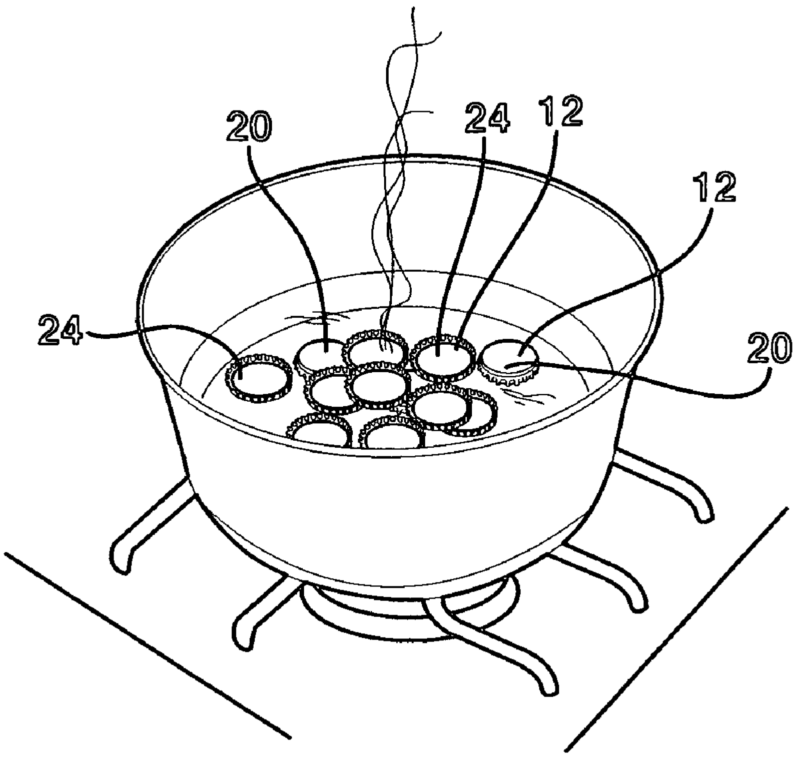
FIG. 5 is a perspective view of the first step of the process to produce the bead of FIG. 1.

It is preferable to remove the seal 26 from the bottle cap 12 before transforming the bottle cap 12 into the bead 10 of the present invention. It is desirable to prepare the seal 26 to make it easier to remove. This is preferably accomplished by placing the bottle cap 12 in a vat of boiling water, as shown in FIG. 5, to soften the seal 26 and to clean the bottle cap 12.

Figure 6:
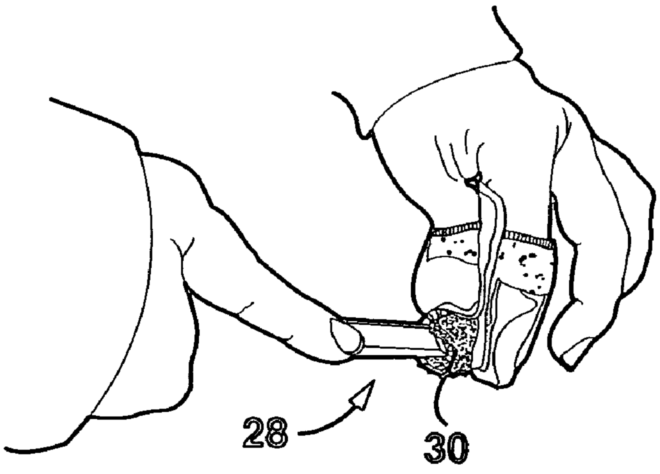
FIG. 6 is a perspective view of the second step of the process to produce the bead of FIG. 1.
Figure 7:
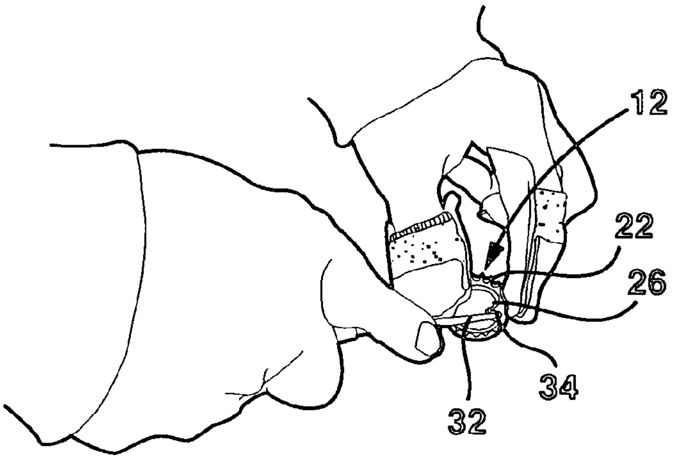
FIG. 7 is a perspective view of the third step of the process to produce the bead of FIG. 1.
Figure 8:
FIG. 8 is a perspective view of the fourth step of the process to produce the bead of FIG. 1.
Figure 9:
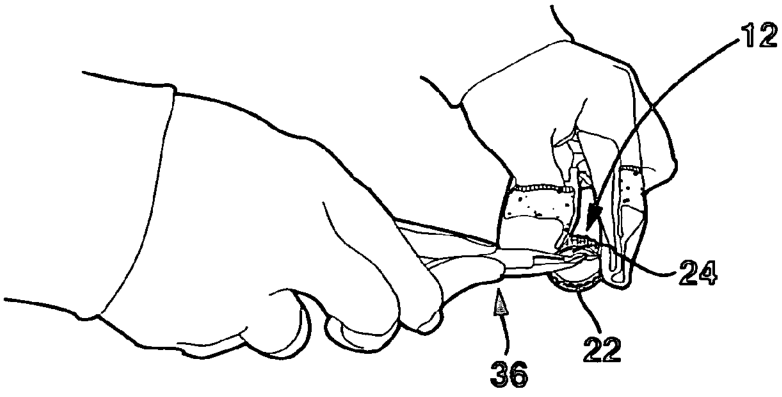
FIG. 9 is a perspective view of the fifth step of the process to produce the bead of FIG. 1.

The removal of the seal 26 from the bottle cap 12 may be accomplished by abrading the seal 26 with an abrasion tool 28 having an abrasive surface 30 as shown in FIG. 6 or by hooking the seal 26 with an instrument 32 having a curved end 34 and then pulling the seal 26 away from the inner surface 24 to separate the seal 26 from the bottle cap 12. Alternately, the seal 26 may be grasped by a pair of pliers 36 and then pulled to separate the seal 26 from the bottle cap 12. After the seal 26 has been removed from the bottle cap 12, the bottle cap 12 may again, but is not required to be placed in a vat of boiling water to remove any remaining residue of the seal 26.

Figure 10:
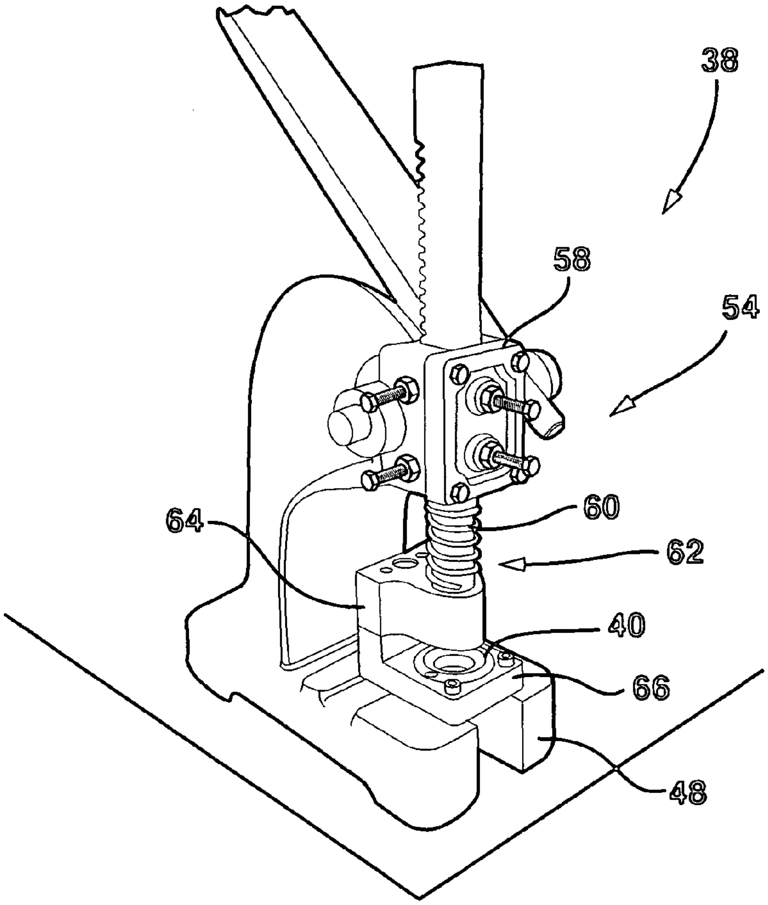
FIG. 10 is a perspective view of the press tool used to make punch members from bottle caps.
Figure 11:
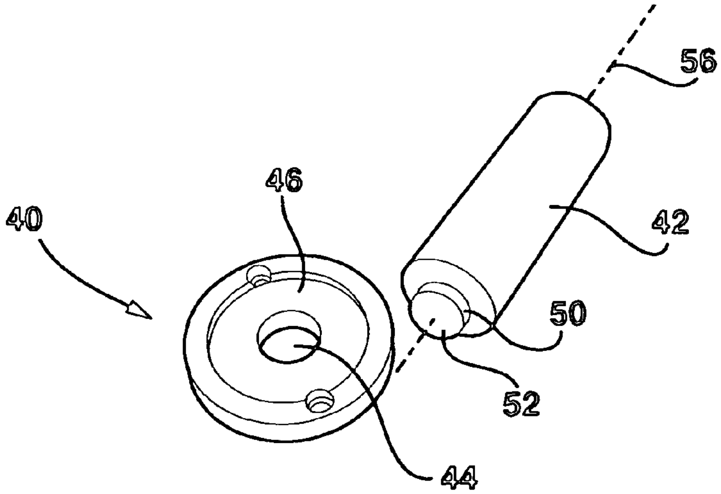
FIG. 11 is a perspective view of the punch member forming tool and cutting die tool used in the press tool of FIG. 10 to produce the bead of FIGS. 1-4.

A press tool 38 such as is shown in FIG. 10 is used to make the punch members 14 from the bottle caps 12. The press tool 38 has a punch member forming tool 40 and a cutting die 42 (FIG. 11) to form the punch members 14. The punch member forming tool 40 has a central hole 44 having a diameter slightly less than the diameter of a bottle cap 12. In particular, the central hole 44 preferably has a diameter that allows the central portion 20 of the bottle cap 12 and a portion of the shoulder connecting the central portion 20 to the crenellated portion of the bottle cap 12 to descend into the central hole 44. This size for the central hole 44 allows the bottle cap 12 to be securely seated and relatively precisely located in the central hole 44 so that the punch member 14 may be formed as will be described hereafter.

The punch member forming tool 40 preferably also has a slight depression 46 for allowing clearance between the bottle cap 12 and the punch member forming tool 40 over the hole 44. Although the preferred embodiment of the press tool 38 includes a punch member forming tool 40 having this depression 46, the depression 46 is not required to practice the invention. The press tool 38 includes a base 48 and the punch member forming tool 40 is securely positioned on the base 48 of the press tool 38 so that the punch member forming tool 40 will not move during its interaction with the cutting die 42 as will be described hereafter.

The cutting die 42 has a cylindrical distal end 50 with a diameter slightly less than the diameter of the hole 44 in the punch member forming tool 40. The ultimate distal end 52 of the distal end 50 is preferably convex having a curvature equal to the curve intended for each of the punch members 14 of the bead 12. The cutting die 42 is connected to a linear actuator 54 of the press tool 38. The linear actuator 54 moves the cutting die 42 in a linear direction along the axis 56 of the cutting die 42 into contact with the punch member forming tool 40 and more specifically so that the distal end 50 of the cutting die 42 moves into mating contact with a hole 44 of the punch member forming tool 40.

The linear actuator 54 of the press tool 38 may take the form of a lever actuated ratchet mechanism 58 as shown in FIG. 10 or may take the form of any other linear actuator as will be well understood by those skilled in the art. The key function of the linear actuator 54 is that it moves the cutting die 42 into and out of contact with the punch member forming tool 40 as described above in a controlled manner. It is also required that once the punch member 14 has been formed as will be described hereafter, the linear actuator 54 moves the cutting die 42 away from contact with the punch member forming tool 40 so that the process may be repeated on a new bottle cap 12 to form another punch member 14.

This is accomplished in one embodiment of the linear actuator 54 by the linear actuator 54 having a linear moving member 60 having a terminal end 62. The linear moving member 60 is constrained to move only in a linear direction. The terminal end 62 is securely connected to the cutting die 42 so that as the linear moving member 60 moves in a linear direction under the impetus and control of the linear actuator 54, the cutting die 42 will also be made to move. To constrain the cutting die 42 to also move in a linear direction, the cutting die 42 preferably passes through a centering member 64. The centering member 64 has a passage dimensioned to be slightly larger than the diameter of the cutting die 42 so that the cutting die 42 is only allowed to move through the passage along the direction of the axis 56 of the cutting die 42.

The punch member forming tool 40 is also connected to a punch member forming tool holding member 66 that is attached to the base 48. As a result, as pressure is applied to the punch member forming tool 40 by the cutting die 42 as will be described hereafter, the punch member forming tool 40, and the bottle cap 12 located in the central hole 44, will not move.

Figure 12:
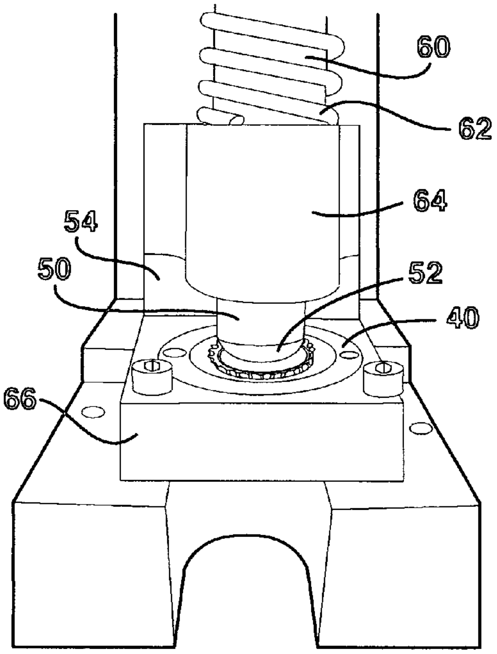
FIG. 12 is a front perspective view of the device of FIG. 10 in a second step to produce the bead of FIG. 1.
Figure 13:
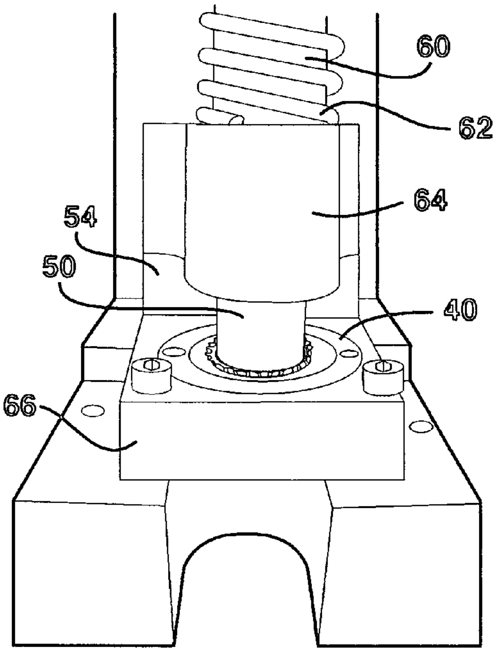
FIG. 13 is a front perspective view of the device of FIG. 10 in a third step to produce the bead of FIG. 1.
Figure 14:
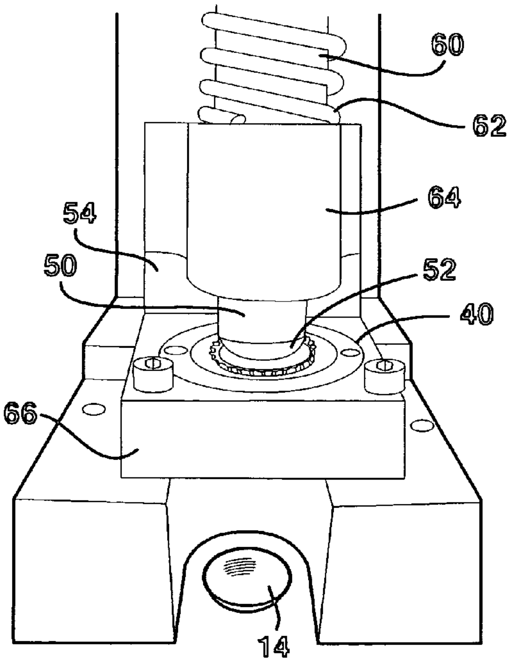
FIG. 14 is a front perspective view of the device of FIG. 10 in a fourth step to produce the bead of FIG. 1.

In operation as shown in FIGS. 12-14, the cutting die 42 is moved away from the punch member forming tool 40 to create a space between the cutting die 42 and the punch member forming tool 40 (FIG. 12). A bottle cap 12 is placed on the punch member forming tool 40 in the depression 46, if present, with the inner surface 24 facing toward the distal end 50 of the cutting die 42. The linear actuator 54 moves the cutting die 42 toward and then into contact with the inner surface 24 of the bottle cap 12 resting on the punch member forming tool 40. Continued movement of the cutting die 42 toward the punch member forming tool 40 causes the ultimate distal end 52 to form the bottle cap 22 into the shape of the ultimate distal end 52 (FIG. 13). Further movement of the cutting die 42 toward the punch member forming tool 40 eventually causes the distal end 50 and the hole 44 to pinch the bottle cap 12 between them and severe the newly formed punch member 14 from the rest of the bottle cap 12. The resulting punch member 14 then passes through the hole 44 to exit the punch member forming tool 40 under gravity or under the impetus of the continued movement of the cutting die 42 through the hole 44 (FIG. 14).

Figure 15:
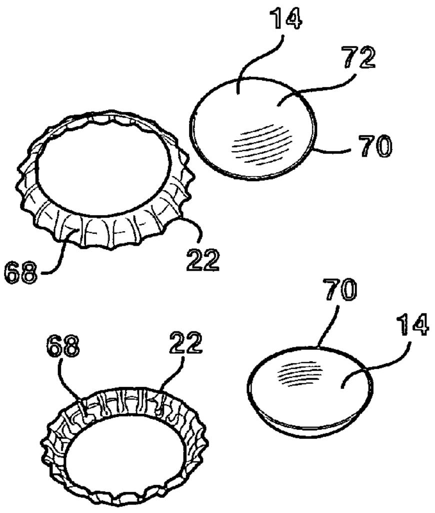
FIG. 15 is a perspective view of a bottle cap having its center punched and formed in a concave shape.

The cutting die 42 is then retracted in the opposite direction to move the cutting die 42 out of mating contact with the punch member forming tool 40 leaving a ring 68 formed of the material of the remaining peripheral edge 22 of the bottle cap 12 as shown in FIG. 15. FIG. 15 shows the punch member 14 and the residual ring 68 from both the top and bottom perspective view after being formed by the press tool 38 as described above. The punch member 14 includes a peripheral edge 70 and an outer surface 72.

After being formed by the press tool 38 as described above, the newly formed punch member 14 is preferably prepared to be joined to another punch member 14 to form the bead 10. Part of this preparation includes forming a smooth surface along the peripheral edge 70 of each punch member 14 to allow each punch member 14 to be joined to its companion punch member 14 along their respective peripheral edges 62. It is usually desirable to "cleanup" the peripheral edge 70 of the punch member 14 in order to remove any irregularities and to form a uniform planar surface for mating with the corresponding peripheral edge 70 of the punch member 14 as will be described hereafter. Consequently, it is desirable to securely grasp the punch member 14 to allow this cleaning up to occur.

Figure 16:
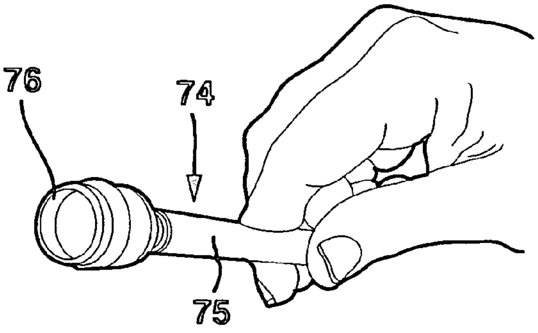
FIG. 16 is a perspective view of tool used to hold a concave member.
Figure 17:
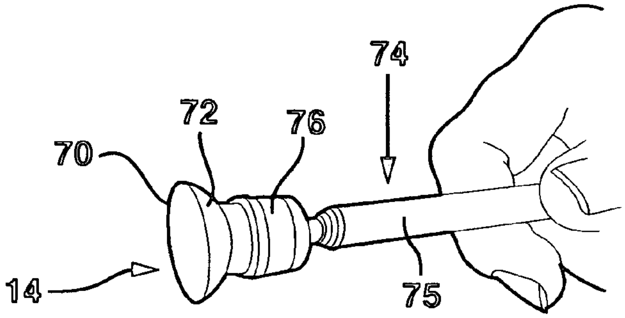
FIG. 17 is a perspective view the tool of FIG. 16 holding a concave member.

This is preferably accomplished through a grasping tool 74 (FIGS. 16-17) having a handle 75 for the user to hold the grasping tool 74 and a concave member 76 that holds the punch member 14. The grasping tool 74 contacts the outer surface 72 of the punch member 14 and holds the punch member 14 in secure contact with the concave member 76 so that access may be easily had with the peripheral edge 70. The concave member 76 preferably has a concavity-approximately equal to the curvature of the outer surface 72 of the punch member 14. In addition, the concave member 76 preferably has a diameter less than the diameter of the punch member 14 so that when the punch member 14 is positioned on the concave member 76, the peripheral edge 70 of the punch member 14 extends beyond the concave member cell that the peripheral edge 70 is accessible to allow the for peripheral edge 70 to be cleaned up (FIG. 17).

In a preferred embodiment of the grasping tool 74, the concave member 76 is made of or includes a magnet to magnetically hold the punch member 14 in contact with the concave member 76. In an alternate embodiment of the grasping tool 74, the concave member 76 forms an airtight seal with the punch member 14 and a slight vacuum is applied to the concave member 76 to hold the punch member 14 in position in contact with the concave member 76. Other means of holding the punch member 14 in the concave member 76 will occur to those skilled in the art including but not limited to adhesives, electrostatic or electromagnetic attraction or friction fit.

Figure 18:
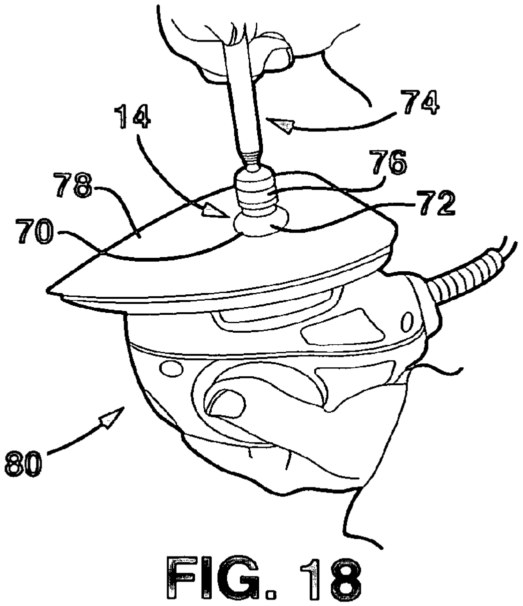
FIG. 18 is a perspective view the tool of FIG. 16 holding a concave member in contact with a sander.

Regardless of the specific details of the mechanism used to hold the punch member 14 in the concave member 76, once a concave member 12 is held in position on the concave member 76, the peripheral edge 70 is now accessible to being cleaned up. This cleaning up process may include sanding the peripheral edge 70 on a flat abrasive surface such as the flat sanding surface 78 of a sander 80 as shown in FIG. 18. The grasping tool 74 allows the peripheral edge 70 of the punch member 14 to be placed into contact with the sanding surface 78 whereby a planar surface is formed on the peripheral edge 70 that will allow respective peripheral edges 70 of punch members 14 to be brought into contact with each other along their entire respective peripheral edges 70.

Once the peripheral edges 70 of the punch members 14 have been prepared, in the preferred embodiment of the bead 10, two punch members 14 are joined together to form a single bead 10 by placing the peripheral edges 70 of each punch member 14 to be joining in contact with each other. Then, the respective peripheral edges 70 are joined to each other.

Figure 19:
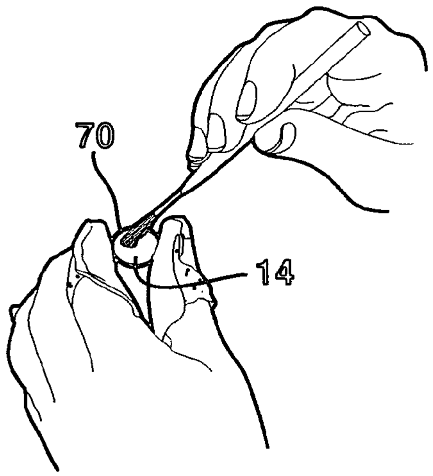
FIG. 19 is a perspective view of two concave members in contact with each other and having flux applied.
Figure 20:
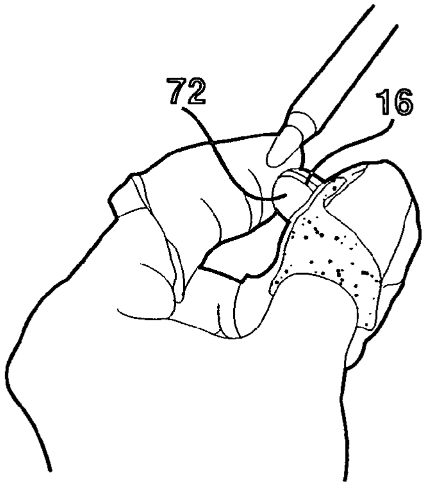
FIG. 20 is a perspective view of the two concave members being soldered together to form a bead.

A preferred way to join these respective peripheral edges 70 is by soldering. In preparation for the soldering process, flux is preferably applied to each peripheral edge 70 (FIG. 19) prior to moving the respective peripheral edges 70 into contact with each other to be joined by the soldering process. Once flux has been applied to each respective peripheral edge 70, the respective peripheral edges 70 are moved into contact with each other whereupon they are joined together by soldering around the entire peripheral edges 70 as shown in FIG. 20 to form the common connection area 16 of the bead 10. The soldering connection that forms the common connection area 16 is preferably thin in order to provide structural integrity between the two peripheral edges 70.

Figure 21:
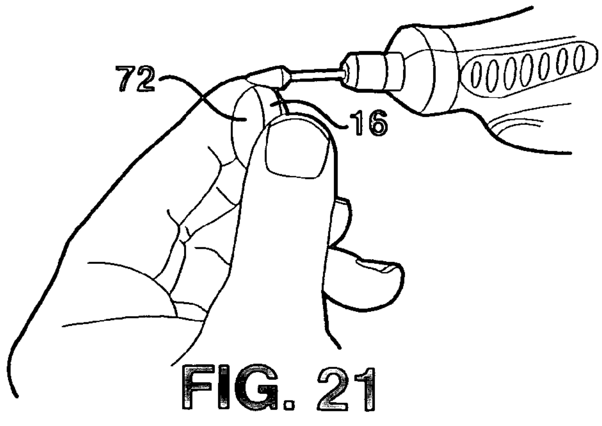
FIG. 21 is a perspective top view of the bead formed in of FIG. 20 having the solder edge burnished.

After two punch members 14 have been joined together by soldering as described above, any imperfections in the soldering process are removed and the soldering weld smoothed out and burnished by contact with an abrasive surface such as a rotary abrasion tool at shown in FIG. 21. Although the process for connecting two punch members 14 to form a bead 10 has been described as a soldering process, any other means for joining respective peripheral edges 70 to form a bead 10 as described above can be used as will occur to those skilled in the art including but not limited to ultrasonic welding, heat staking, adhesives, friction welding, particularly spin friction welding, TIG welding and brazing, the key feature being that the peripheral edges 70 of the convex numbers 12 are joined together in a firm and secure manner. Further, the smoothing or burnishing described above may be carried out by any process well understood in the art to provide a smooth surface along the common connection area 16 between the respective peripheral edges 70.

Figure 22:
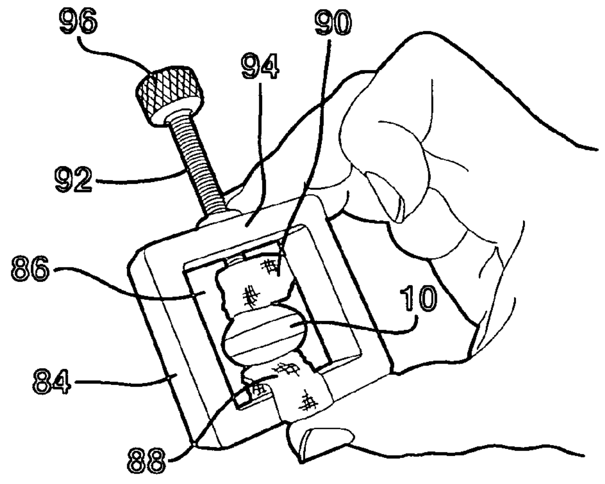
FIG. 22 is a perspective view of a jig holding the bead of FIG. 21.

As described above, it is preferable, but not required, that each bead 10 formed as described above have a hole 18 to allow the bead 10 to be used in an ornamental way, for example as part of a necklace, brooch, earring or hanging ornament. The preferred method for forming this hole 18 is by drilling. This is preferably accomplished by placing be bead 10 in a drilling jig 70 as shown in FIG. 22. The function of the drilling jig 70 is to securely and firmly position the bead 10 in a drill press 82 so that one or more holes 18 may be formed in the bead 10 by the drill press 82.

The drilling jig 70 preferably grasps the bead 10 along opposite outer surfaces 64 so that a portion of the common connection area 16 is exposed and accessible for drilling in the drill press 82. The drilling jig 70 preferably has a frame 84 formed to have a central receiving area 86 large enough to hold a bead 10 as will be described hereafter. The drilling jig 70 also preferably includes a stationary concave bead receiving member 88 having a concave surface preferably of about the same curvature as the outer surface 72 of the bead 10. The stationary concave bead receiving member 88 is preferably attached to one side of the frame 84.

The drilling jig 70 also preferably includes a movable concave bead receiving member 90 located opposite the stationary concave bead receiving member 88. In a preferred embodiment of the drilling jig 70, the movable concave bead receiving member 90 is pivotally attached to a screw 92 that passes through screw threads 94 in the frame 84. The screw 92 has a handle 96 at one end to allow the screw 92 to be rotated to move the screw 92 through the screw threads 94 in the frame 84. The reason the movable concave bead receiving member 90 is pivotally attached to the screw 92 is so that once the movable concave bead receiving member 90 is moved into secure contact with the outer surface 72 of one of the punch members 14 of the bead 10, the movable concave bead receiving member 90 will not rotate as the screw 92 rotates.

In use, the handle 96 is rotated to move the movable concave bead receiving member 90 away from the stationary concave bead receiving member 88 so that a bead 10 may be placed between the movable concave bead receiving member 90 and the stationary concave bead receiving member 88 with the common connection area 16 facing away from the drilling jig 70. A bead 10 is then placed between the movable concave bead receiving member 90 and the stationary concave bead receiving member 88 with the common connection area 16 facing away from the drilling jig 70. The handle 96 is then rotated so that the movable concave bead receiving member 90 is moved into contact with the outer surface 72 of one of the punch members 14 of the bead 10. Further rotation of the handle 96 will move the opposite outer surface 72 of the corresponding punch member 14 into contact with the stationary concave bead receiving member 88. The handle 96 is then turned slightly to secure the bead 10 between the stationary concave bead receiving member 88 and the movable concave bead receiving member 90 but not so much as to crush the bead 10.

Figure 23:
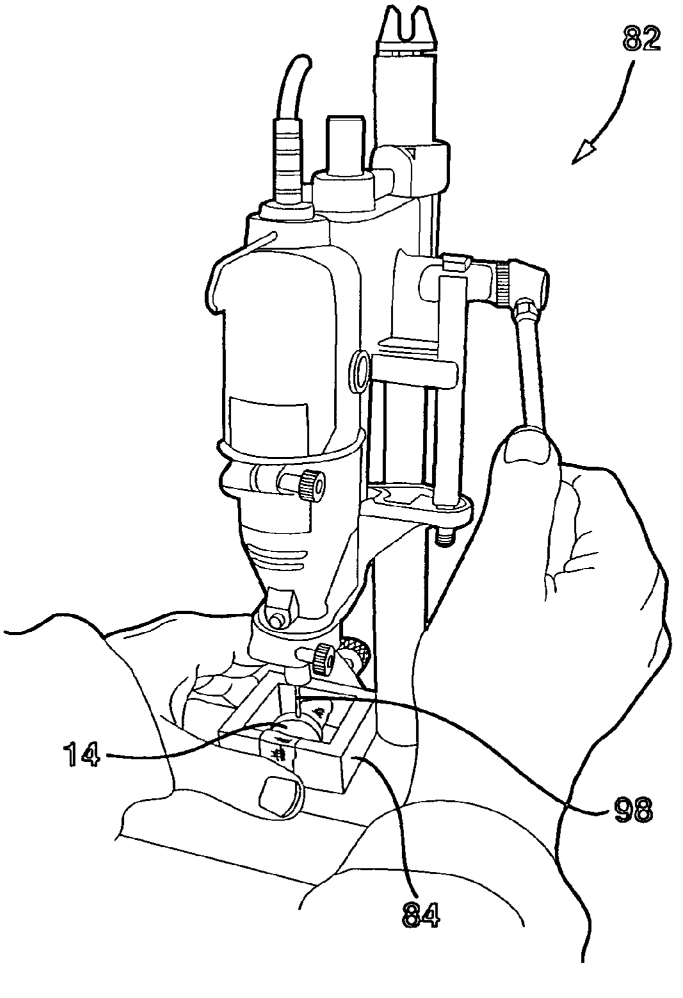
FIG. 23 is a perspective view of the jig holding the bead of FIG. 21 in a drill press.

As mentioned above, the function of the drilling jig 70 is to securely and firmly position the bead 10 in a drill press 82 so that one or more holes 18 may be formed in the bead 10 by the drill press 82. Once the bead 10 has been positioned in the drilling jig 70, the drilling jig 70 is brought to the drill press 82 and located so that a drill bit 98 on the drill press 82 is positioned to produce a hole 18 at a desired location along the common connection area 16. The drill bit 98 is then moved into contact with the desired location on the common connection area 16 to produce the hole 18 (FIG. 23). Where two holes 18 are desired to be formed in the bead 10 on opposite sides of the bead 10, the drilling jig 70 is rotated 180° and the drilling process described above repeated to form a hole 18 in the common connection area 16 opposite the first hole 18.

Figure 24:
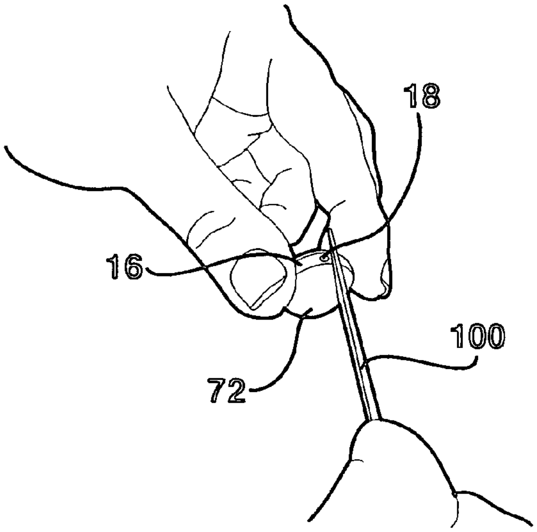
FIG. 24 is a perspective view of the bead of FIG. 23 having the exterior of the hole formed by the press of FIG. 23 smoothed.
Figure 25:
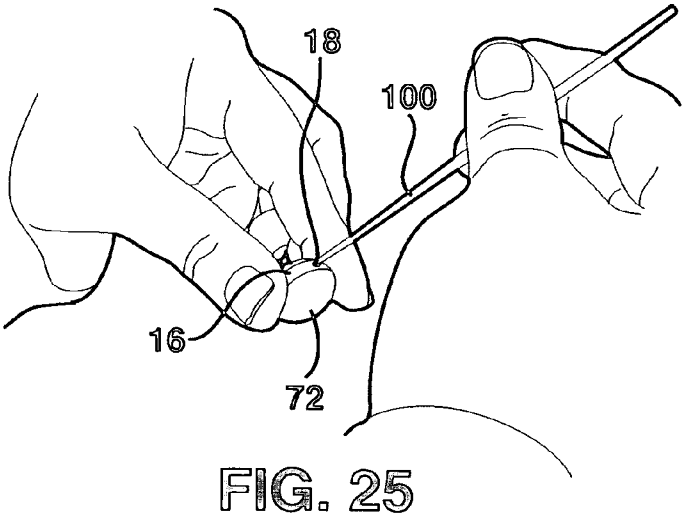
FIG. 25 is a perspective view of the bead of FIG. 23 having the interior surface of the hole formed by the press of FIG. 23 smoothed.

After forming one or more holes 18, it is usually desirable to remove any drilling burrs formed by the drilling process described above. This is preferably accomplished by using a small file 100 moved over the outside of the hole 18 along the common connection area 16 to remove burrs on the outside of the hole 18 (FIG. 24) and also moved into the hole 18 to remove any burrs on the inside of the hole 18 (FIG. 25).

Figure 26:
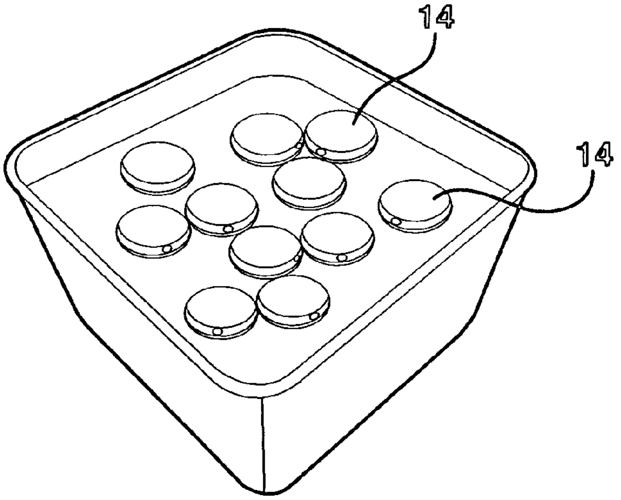
FIG. 26 is a perspective view of the beads of FIG. 25 being cleaned.

After a bead 10 has been formed and one or more holes 18 drilled in the bead 10 as described above, it is desirable to clean the bead 10. This is preferably accomplished by rinsing one or more of the beads 10, for example, in a bath of soda water (FIG. 26). Although a bath of soda water has been described as a preferred method for cleaning the beads 10, any other method for cleaning beads such as will be clear those skilled in the art may be used so long as the beads 10 are cleaned in such a way as to not destroy the integrity of the bead 10 or to damage or deface any printing or indicia on the outer surface 72 of the bead 10.

Figure 27:
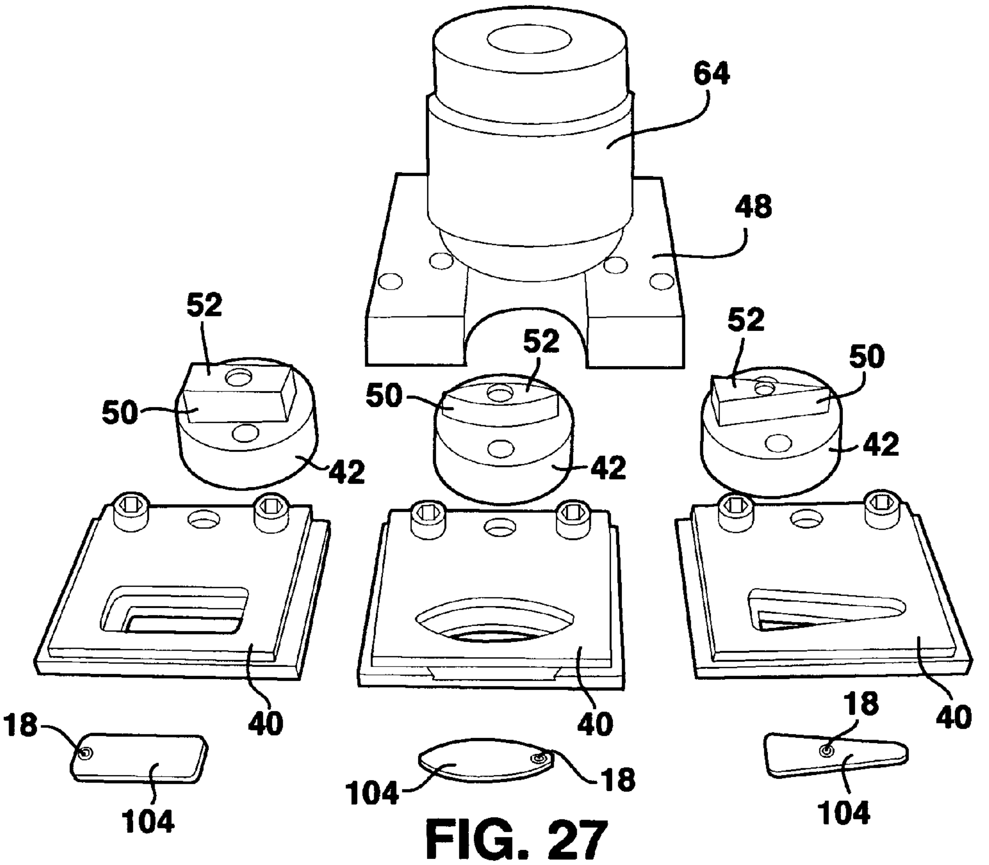
FIG. 27 are perspective views of punches used to form different embodiments of the invention.

Although bead 10 has been described as the primary embodiment of the invention of an ornamental object formed from a bottle cap 12, other ornamental objects 104 may be formed. For example, as shown in FIGS. 27-31, pressing tools 38 with corresponding punch member forming tools 40 and a cutting dies 42 (FIG. 27) may be used to form buttons, brooches, hanging ornament, baubles, pennants, knick-knacks, curios, novelty items, ornaments, trinkets, figurines, objet d'art, souvenirs or other small objects displayed for their attractiveness or interest. FIG. 27 shows examples of punch member forming tools 40 and cutting dies 42 used to produce ornamental objects 104 shown. In each of these punch member forming tools 40 and cutting dies 42, the hole 44 and distal end 50, including the ultimate distal end 52 of the distal end 50, are modified from a circular and cylindrical configuration, respectively, to rectangular, oval, substantially triangular, or any other desired shape. Examples of such other desired shapes include, but are not limited to, free form, the shape of a state or country, cartoon characters, trademark symbols, geometrical shapes, shapes having a single or different three dimensional heights or configurations, three-dimensional figures or text.

Figure 28:
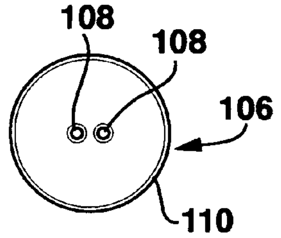
FIG. 28 is a front view of an alternate embodiment of the invention in the form of a button.

Further, the ultimate distal and 52 may be modified to be flat, thereby producing a flat ornamental object 104 or button 106 such as is shown in FIGS. 27 and 28, respectively, concave as described above in connection with the bead 10 or any other three-dimensional shape of interest in these ornamental objects 104 or in the beads 10. In other words, the distal end 50 and ultimate distal end 52 may be formed in any three-dimensional shape to produce beads 10 or other ornamental objects 104 that would then have a corresponding three-dimensional shape including but not limited to semi-spherical, part of the surface of a sphere, flat, geometric shapes, faces, icons, trademarks, art objects, instruments used in sports or any other three-dimensional shape that the imagination can conceive.

FIG. 28 shows a ornamental object 104 in the form of a button 106 made according to the teachings of the present invention and having sewing holes 108 and a peripheral edge 110. The button 106 is made using a punch member forming tool 40 having a circular hole 44 and a cylindrical cutting die 42 preferably having a flat ultimate distal end 52. But, it is to be understood that this tool can be used to make punch members 14 of any of the disclosed shapes and configurations including flat or convex punch members 14.

The bottle cap 12 is placed on the punch member forming tool 40 as described above and the cutting die 42 moved into contact with the inner surface 24 of the bottle cap 12. As the cutting die 42 is advanced, the button 106 is cut out of the bottle cap 12 as the shoulder of the cutting die 42 contacts the edge of the hole 44 and severs the button 106 from the bottle cap 12. The sewing holes 108 in the button 106 are formed by drilling by the drill press 82 or by punching by the ultimate distal end 52 of the cutting die 42 or by a separate punch. Further, the peripheral edge 110 may be smoothed by bringing the peripheral edge 110 into contact with abrasive material.

The process for making an ornamental object 104 whether in the form of a bead 10 or any other ornamental object 104 has been described. In brief, the method, in its simplest form, of forming an ornamental object comprises the steps of:

providing at least two bottle caps 12;

punching out a punch member 14 from the central portion 20 of each bottle cap 12, each punch member 14 having a punch member peripheral edge 70;

bringing the punch member peripheral edges 70 together; and joining the two punch members 14 together along their punch member peripheral edges 70 to form a common connection area 16.

This method may be modified by modifying the step of providing a bottle cap to include the step of providing a bottle cap having a seal. The method may then be further modified by adding, after the step of providing a bottle cap having a seal, the step of removing the seal from the bottle cap. In addition, the method may then be further modified by adding, after the step of removing the seal from the bottle cap, the step of removing any remaining residue of the seal and cleaning the bottle cap.

In addition or in the alternative, the method may be modified by performing, after the step of punching out a punch member from the bottle cap, the step of forming a smooth surface along the peripheral edge of each punch member. Further, in addition or in the alternative, the method may be modified by performing, after the step of punching out a punch member from the bottle cap, the step of removing any irregularities and forming a uniform planar surface for the peripheral edge.

Figure 29:
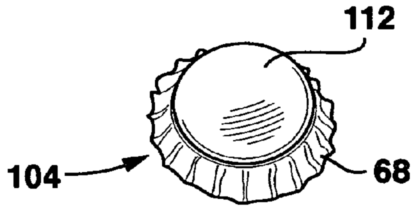
FIG. 29 is a perspective view of an alternate embodiment of the invention in the form of a brooch.

The bead 10 described above has been formed by punching a punch member 14 out of a bottle cap 12 and leaving the ring 68 behind. However, an ornamental object 104 may be formed from bottle cap 20 that has both the punch member 14 and the peripheral edge 22 of the bottle cap 12 still attached to the punch member 14. This is accomplished by placing the bottle cap 12 on the punch member forming tool 40 and advancing the cutting die 42 having a cylindrical distal end 50 and a semi-spherical ultimate distal and 52 into contact with the inner surface 24 as described above. However, in this embodiment, the distal end 50 is not advanced far enough to pinch the material of the bottle cap 12 between the distal end 50 and the shoulder of the hole 44 to cut the punch member 14 from the peripheral edge 22 as described in connection with the formation of the bead 10. Instead, once the punch member 14 is formed, but before the punch member 14 is separated from the peripheral edge 22, the cutting die 42 is retracted. As a result, an ornamental object 104 is formed having a punch member 14 attached to a peripheral edge 22 as shown in FIG. 29. In this embodiment, the punch member 14 becomes a central area 112 that is attached to the peripheral edge 22. Of course, the cutting die 42 may be modified as described herein to produce shapes other than a semi-spherical central area 112 to produce a desired ornamental object 104.

Figure 30:
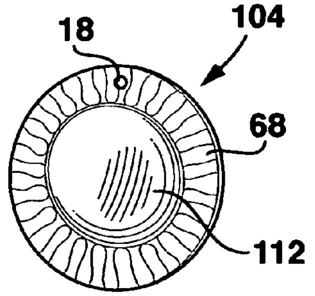
FIG. 30 is a front view of an alternate embodiment of the invention in the form of a hanging ornament.

In a variant of the punch member forming tool 40 and cutting die 42 in various forms described above, the cutting die 42 includes a shoulder extending around the distal end 50 to flatten the peripheral edge 22 of the bottle cap 12 to produce an ornamental object 104 as shown in FIG. 30. In this embodiment, a distal end 50 having a ultimate distal end 52 in any of the described forms may be used to produce a central area 112 of desired configuration. However, during the formation of this embodiment of an ornamental object 104, the central area 112 is surrounded by a flattened peripheral edge 22. The ornamental object 104 may be made of a single bottle cap 12 or may be formed of two bottle caps 12 formed as described above and connected along their respective peripheral edges 22 to produce an ornamental object 104 having three-dimensional features on each side of the ornament object 96. The ornamental features, in the form of the respective the central areas 104 of each side of the ornamental object 104, may be the same or different in shape or design. Further, it is preferable to have a hole 18 formed in this ornamental object 104 to allow the ornamental object 104 to be displayed, as for example, as a necklace.

Figure 31:
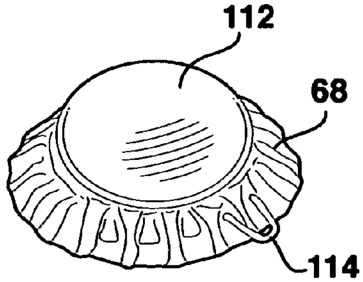
FIG. 31 is a front view of an alternate embodiment of the invention in the form of another form of a pennant.

A variant of the ornamental object 104 just described is shown in FIG. 31. In this embodiment, the peripheral edge 22 is not flattened into a planar configuration but is instead either allowed to remain in its original or moved into a frustoconical shape (i.e., the shape of a cone with the pointed end cut off) by the interaction of the punch member forming tool 40 and cutting die 42. In this embodiment, the cutting die 42 again includes a shoulder extending around the distal end 50. But, instead of the shoulder being at a right angle to the axis 56 of the cutting die 42 so as to flatten the peripheral edge 22 of the bottle cap 12, the shoulder is in a frustoconical shape to produce an ornamental object 104 as shown in FIG. 31. In this embodiment as well, a distal end 50 having a ultimate distal end 52 in any of the described forms may be used to produce a central area 112 of desired configuration. As a result, during the formation of this embodiment of an ornamental object 104, the central area 112 is surrounded by a peripheral edge 22 in a frustoconical shape. The ornamental object 104 may also be made of a single bottle cap 12 or may be formed of two bottle caps 12 formed as described above and connected along their respective peripheral edges 22 to produce an ornamental object 104 having three-dimensional features on each side of the ornament object 96. The ornamental features, in the form of the respective the central areas 104 of each side of this embodiment of the ornamental object 104, may be the same or different in shape or design.

Further, in one form of the ornamental object 104 the ornamental object 104 includes a hole 18 formed in the ornamental object 104, preferably in the peripheral edge 22, to allow the ornamental object 104 to be displayed, as for example, as a necklace or earring. In another form of this or any other ornamental object 104, instead of a hole 18, a loop 114 may be formed, for example, of a thin metal wire and attached to the ornamental object 104 to allow the ornamental object 104 to be displayed. The loop 114 is preferably attached to the peripheral edge 22 but may be attached to the central area 112 as well.

Figure 32:
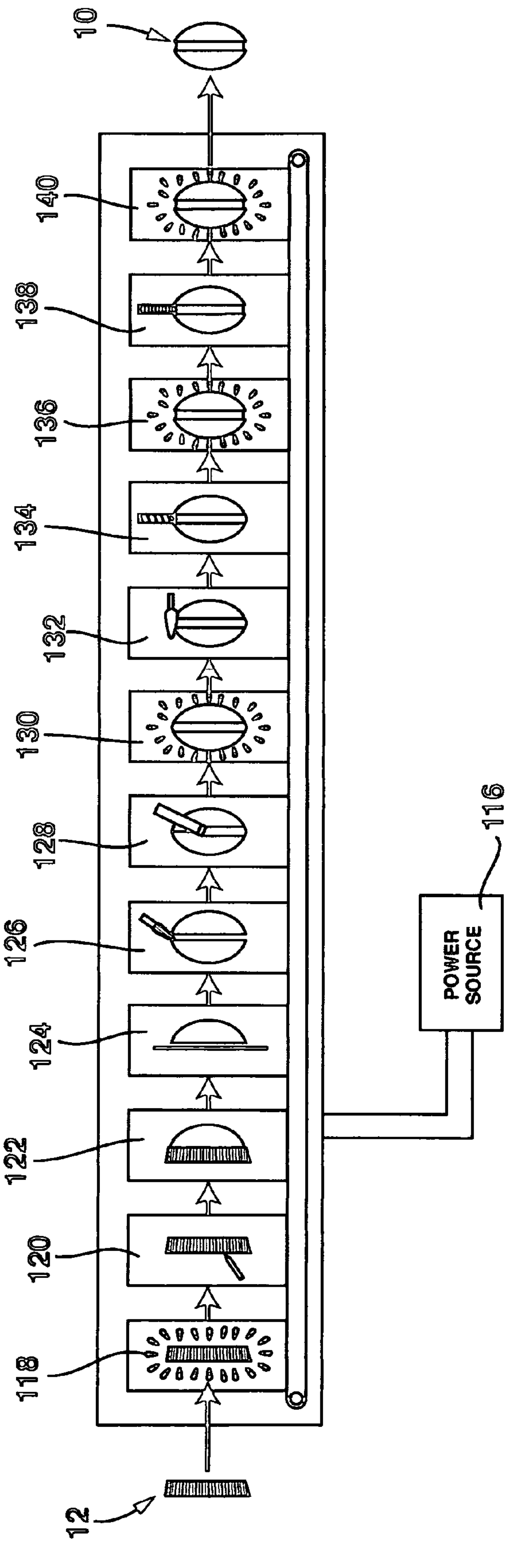
FIG. 32 is a schematic view of a mechanized process for forming the bead of FIG. 1.

The process for making an ornamental object 104 whether in the form of a bead 10 or any other ornamental object 104 has been described as being a manual process. However, it is also intended that the process for making these ornamental objects 104 be done via an automated manufacturing machine. FIG. 32 shows the steps of one preferred method of production in schematic form as performed by an automated manufacturing machine, preferably a system having a power source 116, to produce beads 10 or other ornamental objects 104 as described herein. The individual steps of production are well understood and well within the scope of those skilled in the art in either a manual or automated production process. The process illustrated includes the steps of:

cleaning the bottle cap 12 (step 118);

removing the seal 26 (step 120);

forming the punch member 14 in the press tool 38 (step 122);

cleaning up the punch member 14 (step 124);

adding flux to the peripheral edges 70 of each punch member 14 (step 126)

joining to punch members 14 to form a bead 10 or other ornamental object 104 (step 128);

cleaning the bead 10 (step 130);

smoothing the common connecting area 16 (step 132);

forming a hole 18 in the bead 10 (step 134);

cleaning the bead 10 (step 136)

removing burrs formed by forming the hole 18 (step 138); and cleaning the bead 10 (step 140).

It is not necessary that all of the steps be done precisely in the order depicted. For example, step 132 may be performed after step 134. In addition, in some cases it will not be necessary to perform certain steps at all. For example, it is possible to eliminate some or all of the cleaning steps 118, 130 or 136, the cleaning up step 124, the smoothing step 132, the forming a hole step 134 or the removing burrs step 138. In addition, if no seal is present on the bottle cap 12, there would be no need for step 120. Also, if the punch members 14 are not joined by soldering, there would be no need for step 126. Further, some steps may be modified (e.g., step 134 modified to replace "forming a hole" with "forming a loop 114"). Further, the process may be simplified in this automated process to the simplified process described above with or without the modifications described above. Other additions to or modifications to the disclosed process will occur to those skilled in the art.

In view the foregoing, the bead 10 or other ornamental objects 104 are described that are formed from a bottle cap 12 in a wide variety of shapes. Further, the beads 10 or ornamental objects 104 preferably retain the printing or other imagery placed on the bottle caps 12 by the original producer of the bottle caps 12. As a result, the resulting beads 10 or ornamental objects 104 are made in an almost infinite variety of attractive and desirable shapes, colors, designs or other visual forms.

In addition, because bottle caps 12 are typically discarded after opening the beverage containing bottles that the bottle caps 12 seal, using bottle caps 12 to make ornamental objects such as jewelry as described herein recycles the bottle caps 12 and thereby reduces waste. As a result, the art objects described herein are environmentally responsible as well as attractive.

Further, although bottle caps 12 have been described as the objects used to form the ornamental objects, other material and components may be used as well. For example, metal lids, often made of steel, are often used to seal beverage containers containing, for example, fruit juices. The metal lids are often larger than traditional bottle caps 12. Further, the metal used to produce cookie tins (e.g., those sold under the by Gallant, Inc. of Orlando, Fla.), candy tins (e.g., those sold under the by Century Mart Trading Ltd. of Hong Kong), mint holding containers (e.g., those sold under the trademark ALTOIDS® by Callard and Bowser-Suchard, a division of the Wm. Wrigley Jr. Company of Peoria, Ill.) or similar containers may be punched into blanks that may then be used to form the beads 10 or ornamental objects 104 of the present invention. In using either the metal lids or metal from the cookie tins, candy tins, mint holding containers or similar containers, the punch member forming tool 40, cutting die 42 including distal end 50 and ultimate distal end 52 and holding member 66 may be adapted as will be clear to those skilled in the art to accommodate the size of the metal lids or tins and produce the beads 10 or ornamental objects 104 of present invention as described herein.

The present invention has been described in connection with certain embodiments, configurations and relative dimensions. However, the description above is not to be construed as being limited to the particular disclosed embodiments. It is to be understood that the description given herein has been given for the purpose of explaining and illustrating the invention and is not intended to limit the scope of the invention. For example, the specific form and size of the punch member 14, including whether the punch member 14 has a convex shape or any other flat or 3-dimensional shape as described above, may be varied according to the desire of the user. Also, two or more than two punch members 14, whether actually convex, flat or in any other three-dimensional configuration, may be joined together to form beads 10 or ornamental objects 104 of a variety of shapes other than those disclosed above. For example, several flat punch members 14 may be joined together to form triangular or rectangular boxes, or attached to an ornamental object 104 such as the hanging ornamental object 104 shown in FIG. 30 in a petal like configuration with the hanging ornamental object 104 shown in FIG. 30 forming the center of a flower and the additional punch members 14 attached as petals.

Also, although the drilling jig 70 has been described in connection with making a bead 10, the drilling jig 70 is intended to be used to help make other ornamental objects 104 as will be clear to those skilled in the art.

In addition, it is clear than an almost infinite number of minor variations to the form and function of the disclosed inventions could be made and also still be within the scope of the invention. Consequently, it is not intended that the inventions be limited to the specific embodiments and variants of the inventions disclosed. It is to be further understood that changes and modifications to the descriptions given herein will occur to those skilled in the art. Therefore, the scope of the inventions should be limited only by the scope of the claims.

I claim:

1. A method of forming an ornamental object made from bottle caps comprising the steps of:

providing at least two bottle caps;

punching out a punch member from the outer surface of each bottle cap, each punch member having a punch member peripheral edge, wherein punching out the member comprises:

placing at least one of the bottle caps with imagery facing a hole in a punch member forming tool, moving a distal end of a cutting die having a shape toward the bottle cap therewith forming at least a center section of the bottle cap into the shape, and moving the distal end of the cutting die further therewith severing a formed punch member from the bottle cap the formed lunch member retaining imagery of the bottle cap essentially as the imagery appeared before being punched out of the bottle cap centered on the formed punch member;

bringing the punch member peripheral edges together; and joining the two punch members together along their punch member peripheral edges to form a common connection area.

2. The method of claim 1 wherein the step of providing a bottle cap further comprising the step of providing a bottle cap having a seal and further comprising the step of removing the seal from the bottle cap.

3. The method of claim 1 further comprising the step of removing any remaining residue of the seal and cleaning the bottle cap.

4. The method of claim 1 further comprising the step, performed after the step of punching out a punch member from the bottle cap, the punch member having a peripheral edge and an outer surface, of forming a smooth surface along the peripheral edge of each punch member.

5. The method of claim 1 further comprising the step, performed after the step of punching out a punch member from the bottle cap, the punch member having a peripheral edge and an outer surface, of removing any irregularities and forming a uniform planar surface for the peripheral edge.

6. The method of claim 1 further comprising the step of forming a hole in the common connection area entirely through the common connection area.

7. The method of claim 1 wherein the method is performed through-manual manipulations.

8. The method of claim 1 wherein the method is performed through automated manipulations.

9. A method for forming an ornamental object comprising:

placing a bottle cap with imagery facing a hole in the punch member forming tool;

centering the bottle cap over the hole in the punch member forming tool;

moving a distal end of a cutting die having a shape toward the bottle cap therewith forming at least a center section of the bottle cap into the shape;

moving the distal end of the cutting die further therewith severing a formed punch member from the bottle cap, the formed punch member retaining imagery of the bottle cap essentially as the imagery appeared before being punched out of the bottle cap centered on the formed punch member; and joining fixedly the formed punch member and at least one other punch member along their respective peripheral edges to form a hollow bead with a common connection area.

10. The method of claim 9, wherein the shape is a convex shape.

* * * * *